United States Patent [19]

Baxter

[11] 4,204,790
[45] May 27, 1980

[54] TRAILER FOR LIFTING AND TRANSPORTING ROUND BALES OF HAY

[75] Inventor: Bobby G. Baxter, Warrenton, Mo.

[73] Assignee: The Binkley Company, Warrenton, Mo.

[21] Appl. No.: 800,698

[22] Filed: May 26, 1977

[51] Int. Cl.$^2$ .................... A01D 87/12; B65G 57/32
[52] U.S. Cl. .................. 414/24.5; 280/43.23; 280/468; 280/656; 414/459
[58] Field of Search ............... 214/1 HH, 1 HA, 6 B, 214/350, 351, 353, 390, 392, 394, 396, 512, DIG. 1, DIG. 3, DIG. 4; 280/42, 43.23, 467, 468, 656, 423 B, 472, 473; 56/473.5

[56] References Cited

U.S. PATENT DOCUMENTS

| | | | |
|---|---|---|---|
| 1,244,783 | 10/1917 | Ruckes | 214/392 |
| 2,875,911 | 3/1959 | Jennings et al. | 214/394 |
| 3,237,798 | 3/1966 | Hampl | 214/394 |
| 3,348,711 | 10/1967 | Gove | 280/656 X |
| 3,688,932 | 9/1972 | Carter | 214/394 |
| 3,698,734 | 10/1972 | Drake | 280/656 |
| 3,768,676 | 10/1973 | Spitzer | 214/392 |
| 3,815,768 | 6/1974 | Goodwin | 280/656 X |
| 4,003,583 | 1/1977 | Stanzel | 280/43.24 X |
| 4,072,241 | 2/1978 | Parker et al. | 214/392 |
| 4,076,137 | 2/1978 | Kucera | 214/394 |

Primary Examiner—L. J. Paperner
Attorney, Agent, or Firm—Senniger, Powers, Leavitt and Roedel

[57] ABSTRACT

Two embodiments of a trailer to be towed by a tractor or truck and hydraulically powered from a hydraulic power source on the tractor or truck for picking up round bales of hay lying on their sides in the field, and for transporting the bales. Each embodiment has spaced-apart rails adapted to lift and cradle round bales of hay, the spacing of the rails being variable for handling bales of different diameters, the rails being adapted to pick up bales in the manner of a fork lift. In the first embodiment, means is provided for towing the trailer either to the left or right of the towing vehicles as well as in line with the towing vehicle, and the trailer may be maneuvered for nonstop front or rear loading and unloading of bales. In the second (and simpler) embodiment, loading and unloading is from the rear only. In each embodiment, the rails are adapted to be positioned generally horizontally, with the bales lifted off the ground for transporting the bales, and to be lowered for unloading the bales.

14 Claims, 13 Drawing Figures

TRAILER FOR LIFTING AND TRANSPORTING ROUND BALES OF HAY

BACKGROUND OF THE INVENTION

This invention relates to a trailer for lifting and transporting round bales of hay or the like, and more particularly to a trailer adapted to be towed by a towing vehicle such as a tractor or a pick-up truck for picking up round bales of hay as they lie on their sides in the field.

It has become generally widespread practice to bale hay into what are called round bales, which are cylindrical bales formed by rolling up the hay, and which are relatively large and heavy, e.g., about six feet in diameter and five feet three inches long, weighing about 1700 pounds, or about five feet in diameter and four feet long, weighing about 850 pounds. Generally, these round bales, as they are formed in the field, are left lying on their sides on the ground, and must be picked up and hauled away for storage and subsequent livestock feeding, or for immediate livestock feeding. They are too large and heavy, however, for being handled manually, and require powered handling. Reference may be made to U.S. Pat. Nos. 3,877,595, 3,935,954, 3,941,265, 3,944,095, 3,951,288, 3,952,895, 3,966,063 and 3,985,253 showing various types of equipment for handling round bales. This invention involves further developments in this art.

SUMMARY OF THE INVENTION

Among the several objects of this invention may be noted the provision of improved apparatus for handling round bales of hay or the like, enabling rapid and efficient lifting and transporting of heavy round bales; the provision of an improved trailer-type vehicle adapted to be towed behind a tractor, a truck, or other towing vehicle, for lifting and transporting the bales; the provision of a trailer for this purpose adapted efficiently to handle weathered, loose or damaged bales, and even bales without twine, without having the bales fall apart; the provision of such a trailer adapted, in loading bales, to compress them endwise for improved resistance of the bales to weather when in storage in the open; the provision of such a trailer which is of relatively simple and economical construction for all that it can accomplish, which utilizes the hydraulic system of a typical farm tractor or hydraulic system installed in a pick-up truck for power, without any other power takeoff requirements, and which is economical to maintain; the provision of a such trailer adapted for non-stop loading of bales on the trailer (i.e., loading of bales on the trailer as it is driven through the field without having to stop to pick up a bale); the provision of such a trailer adapted for either non-stop loading on forward travel of the trailer or non-stop loading on rearward travel (backing up) of the trailer, and for non-stop unloading from either the front or the rear; and the provision of such a trailer adapted for operation either on the right or left of the tractor as well as in line with the tractor for efficiently loading and unloading bales and in line with the tractor for efficiently transporting bales.

In general, a trailer of this invention as herein claimed comprises a frame; on wheels adapted to roll over the ground, with rails extending longitudinally at opposite sides of the frame spaced apart transversely of the frame for supporting a series of round bales cradled in the rails in end-to-end relation. The frame has an upper portion above the level of bales cradled in the rails. A tongue extends forward from the upper portion of the frame beyond the forward end of the rails, and has a downwardly extending forward end portion provided with a hitch for connection of the tongue to the towing vehicle with the tongue extending generally parallel to the rails and above said series of bales. The tongue is pivotally connected to the upper portion of the frame, for swinging of the tongue relative to the frame about a generally vertical axis, and power means is provided for swinging the tongue relative to the trailer for pulling the trailer to the right or left of the towing vehicle or in line with the towing vehicle.

Other objects and features will be in part apparent and in part pointed out hereinafter.

BRIEF DESCRIPTION OF THE DRAWINGS

Corresponding reference characters indicate corresponding parts through out several views of the drawings.

DESCRIPTION OF THE PREFERRED EMBODIMENTS

Figure 1:
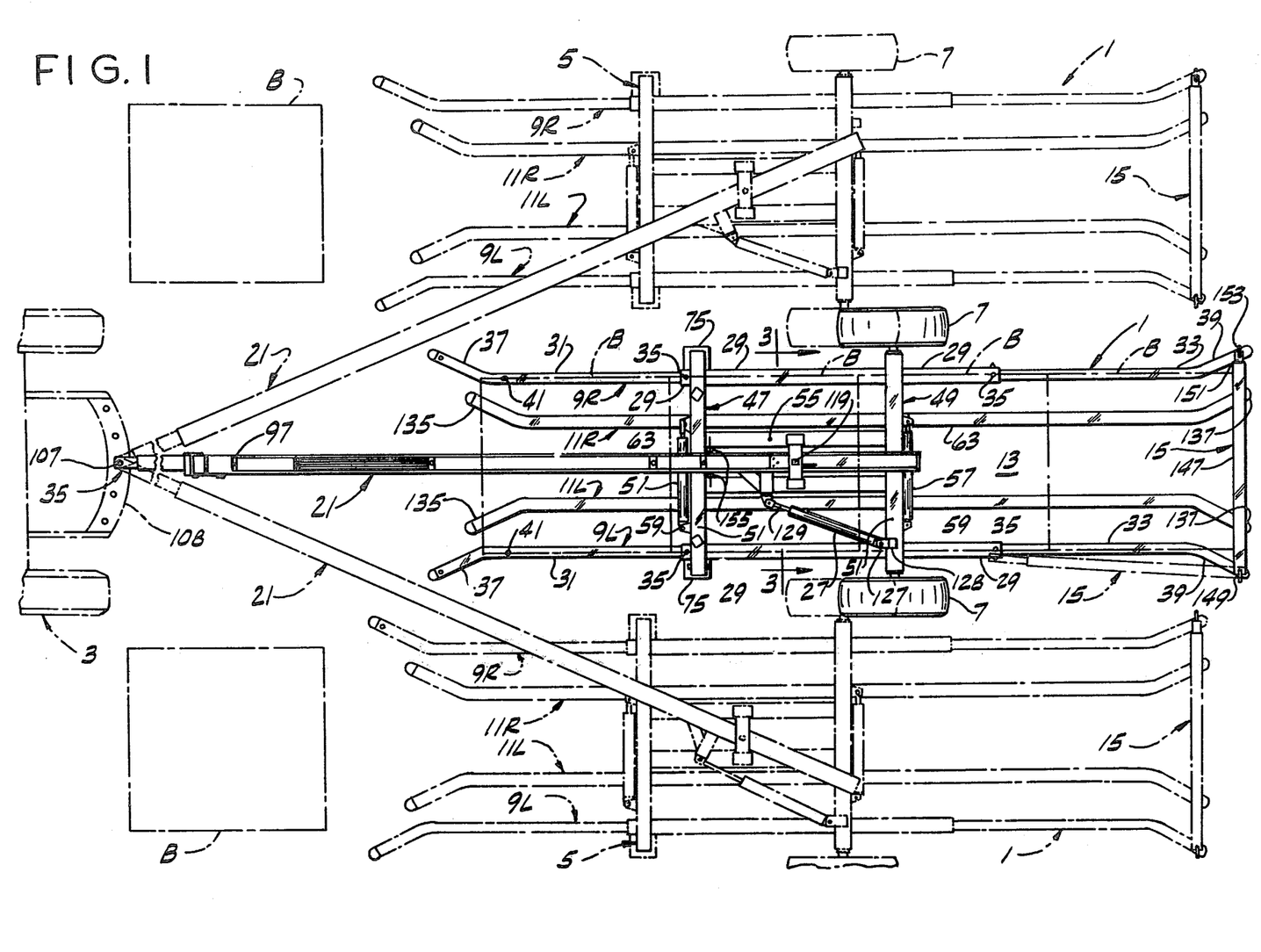
FIG. 1 is a plan of a trailer of this invention adapted for both forward and rearward loading of bales thereon, showing in solid lines the trailer directly behind a towing vehicle, and in phantom the trailer being towed to the left or the right of the towing vehicle, and showing bales in phantom.
Figure 2:
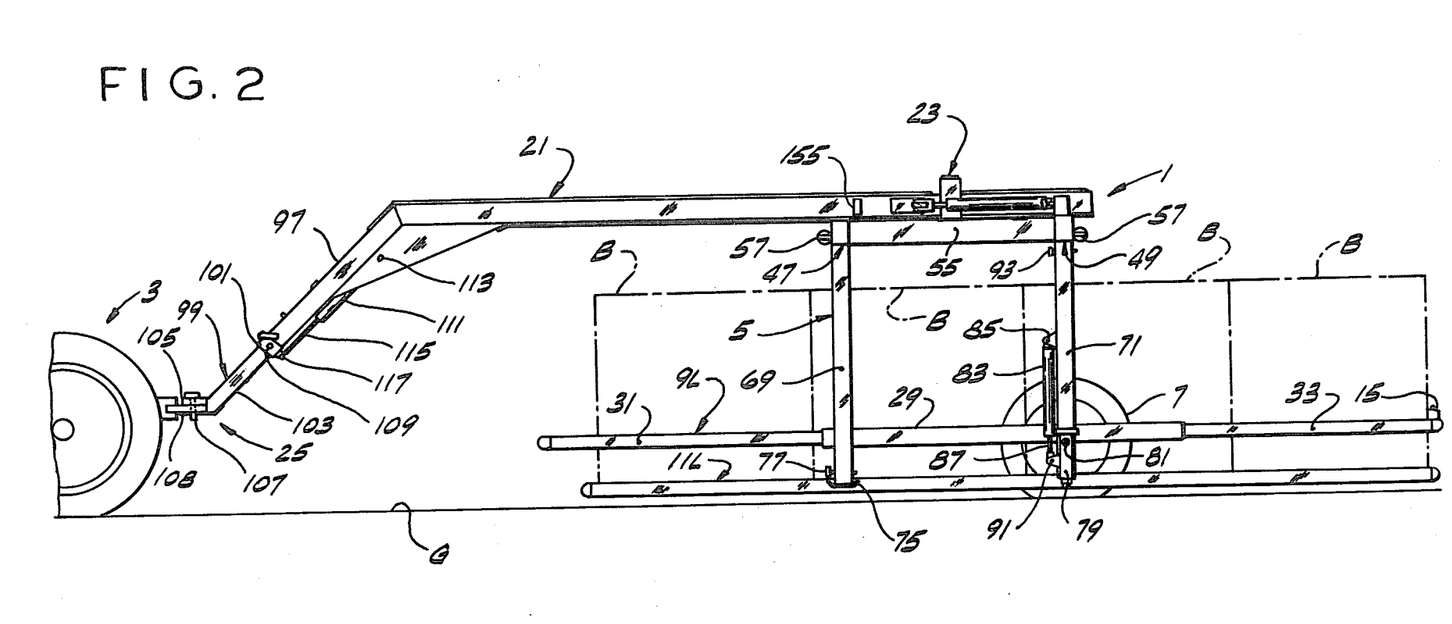
FIG. 2 is a side elevation of FIG. 1 with a wheel removed to show parts which would otherwise be hidden by the wheel, and showing a series of bales in phantom.

A trailer of this invention is shown in FIGS. 1–10, where in FIGS. 1 and 2 the trailer in its entirety is designated 1 and is shown as hitched to a towing vehicle 3, such as a conventional farm tractor, for being towed by the towing vehicle for picking up round bales of hay such as indicated at B lying on their sides on the ground, for transporting the bales to a site where the bales are to be unloaded, and for then unloading the bales, as will appear.

Figure 3:
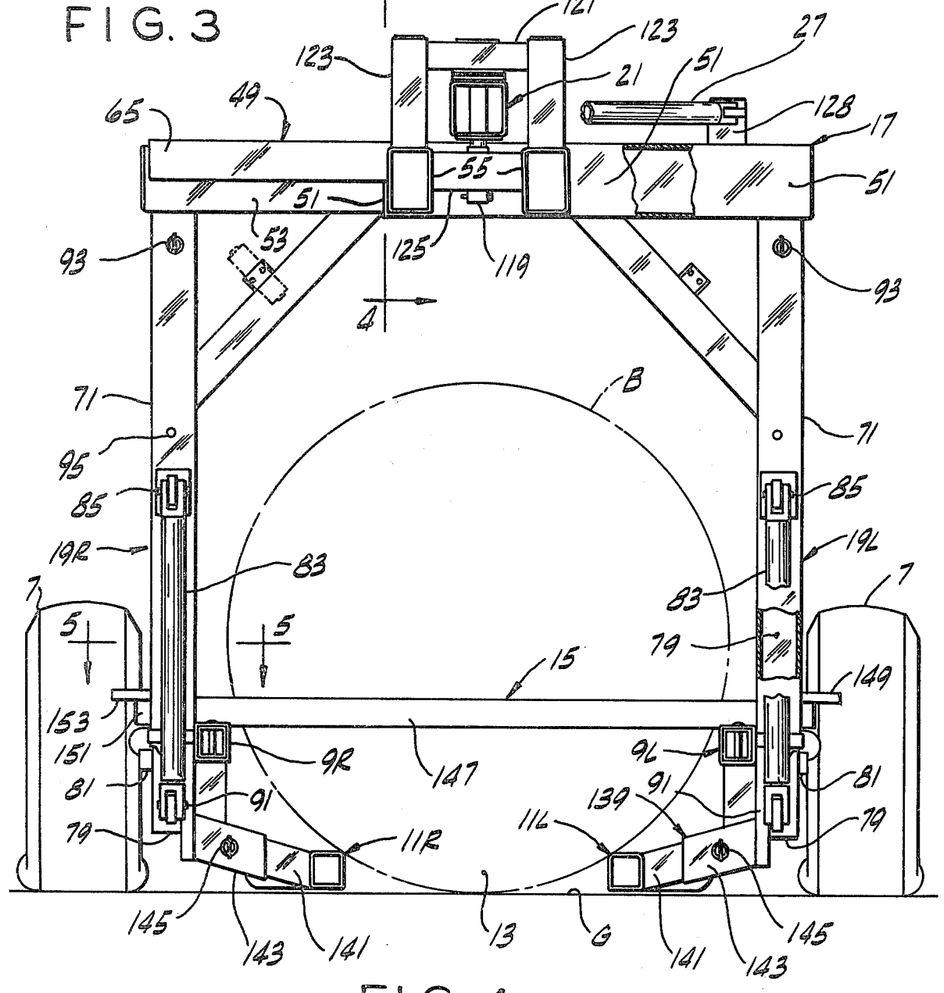
FIG. 3 is an enlarged vertical transverse section on line 3—3 of FIG. 1, showing a frame of the trailer in lowered position.
Figure 4:
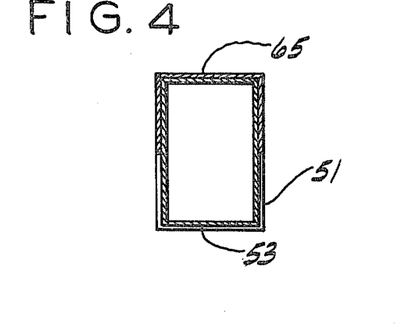
FIGS. 4 and 5 are sections on lines 4—4 and 5—5, respectively, of FIG. 3.
Figure 5:
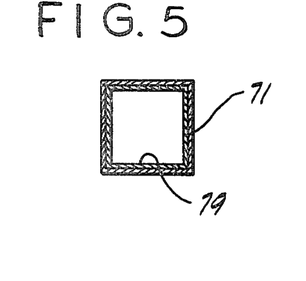

The trailer comprises a frame designated in its entirety by the reference numeral 5 on wheels 7 adapted to roll over the ground, and rails extending longitudinally at opposite sides of the frame. As shown, there are two rails at each side of the frame, an upper rail and a lower rail, the upper and lower rails at the left side of the frame (as viewed in forward direction) being designated 9L and 11L and the upper and lower rail at the right side being designated 9R and 11R. The rails at the left and the rails at the right are spaced apart transversely, and the space between the left-hand and right-hand rails, which is indicated at 13 in FIGS. 1 and 3 is shown as unobstructed from the forward end of the rails all the way to the rear end of the rails, where there is shown a bale stop indicated at 15, so that the rails are adapted to support a series of round bales B cradled in the rails in end-to-end relation, in the manner illustrated in phantom in FIGS. 1 and 2, extending from adjacent the forward end of the rails back to the stop 15.

The frame 5 is generally of inverted U-shape, (see FIG. 3) thereby having an upper portion or top generally designated 17 above the level of bales cradled in the rails, and left-hand and right-hand sides generally designated 19L and 19R extending down from the top. The rails 9L and 11L and the rails 9R and 11R extend longitudinally of the frame 5 at the left and right sides of the frame on the inside of the sides of the frame. They extend forward and rearward from the frame and are spaced transversely of the frame for supporting the series of bales B with the series extending through the frame between the sides of the frame and under the top of the frame. Means is provided for hitching the frame to the towing vehicle 3, comprising a tongue generally designated 21 extending forward from the top 17 of the inverted U-shape frame 5 beyond the forward end of the rails 9L and R and 11L and R for connection at its forward end to the tractor 3. Means indicated at 23 toward the rearward end of the tongue pivotally connects the tongue to the top 17 of the frame for swinging of the tongue relative to the frame about a generally vertical axis. Means indicated at 25 at the forward end of the tongue provides for pivotally connecting the tongue to the tractor with this connection permitting swinging of the tongue relative to the tractor about a generally vertical axis. With this arrangement, the tongue may swing to the right or left relative to the tractor, or occupy a position in line with the tractor (see FIGS. 1 and 6). Power means constituted by a hydraulic cylinder 27 is provided for swinging the tongue relative to the trailer on the vertical swing axis at 23 to cause the tongue to swing to the left or to the right on the pivot at 25 for towing the trailer 1 at the left or at the right of the tractor.

The upper left-hand rail 9L and the upper right-hand rail 9R each comprises a central section 29 constituted by a tubular member of rectangular cross-section and forward and rearward end sections 31 and 33 removably secured by pins such as indicated at 35 to the central section. The rearward ends of the forward sections fit telescopically in the forward ends of the central section and the forward ends of the rearward sections fit telescopically in the rearward ends of the central section. The pins 35 fit in holes in the sections and are removable so that the forward and rearward sections may be pulled out for being shipped separately from the frame for conserving shipping space. The forward ends of the forward sections are flared outwardly as indicated at 37 in FIG. 1 and the rearward ends of the rearward sections are flared outwardly as indicated at 39. The forward and rearward sections may be identical parts. The forward sections may be slid into the central section, on removing the pins 35, and repinned in holes 41, to locate the flared ends of the forward sections rearward of the forward ends of the lower rails 11L and 11R.

Figure 6:
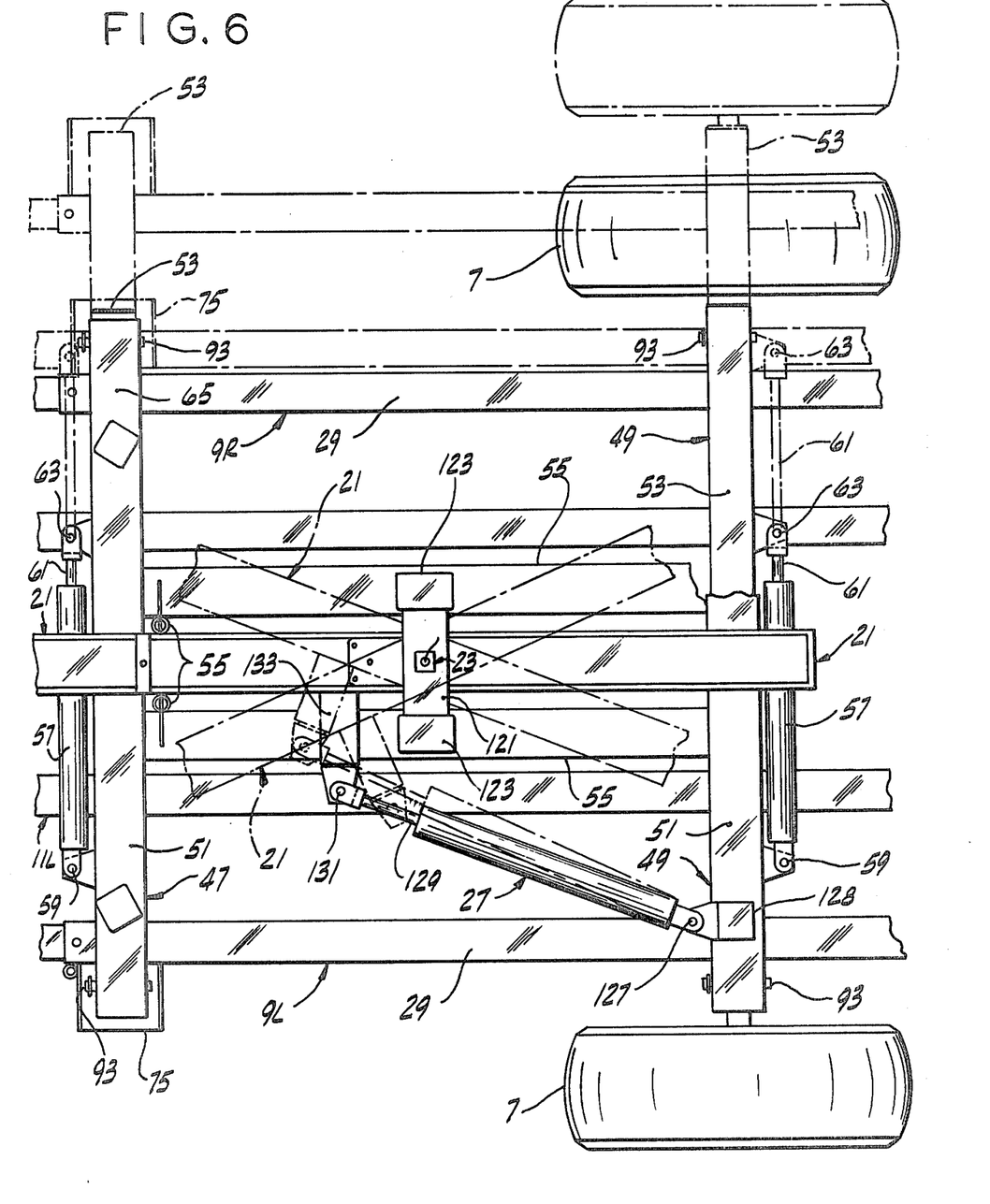
FIG. 6 is an enlargement of part of FIG. 1, showing in phantom an expanded condition of the trailer.

The top 17 of the frame 5 comprises means which is extensible and retractable laterally with respect to the trailer for varying the spacing of the sides 19L and 19R and hence varying the spacing of the left-hand pair of rails 9L, 11L and the right-hand pair of rails 9R, 11R. Thus, as shown in FIGS. 1 and 6, the top 17 of the frame comprises an extensible and retractable forward crossbar 47 and an extensible and retractable rear crossbar 49. Each of these bars comprises a tubular outer guide member 51 of rectangular cross section (see FIG. 4) and an inner extensible and retractable member 53 also of rectangular cross section having a telescoping sliding fit in the outer guide member. The outer guide members 51 of the forward and rear crossbars 47 and 49 are secured as by welding at the forward and rear ends of a pair of longitudinal bars 55. The outer guide members 51 extend toward the right from the left-hand side 19L of the frame and the extensible and retractable inner members 53 extend out of the right ends of the outer guide members 51 to the top of the right-hand side 19R of the frame. Double-acting hydraulic cylinders 57 (see FIGS. 1 and 6) are pinned as indicated at 59 at their left ends to the outer guide members 51 and have piston rods 61 extending from pistons therein (not shown) to pin connections at 63 with the inner members 53 for telescopically extending and retracting the inner members 53 relative to the outer guide members 51. The outer guide members have extensions 65 of half cross section (see FIGS. 3, 4 and 6) covering the inner members 53.

The left-hand side 19L and the right-hand side 19R of the frame each comprises a pair of uprights 69 and 71 spaced longitudinally with respect to the trailer 1, the upright 69 being the forward upright and the upright 71 being the rear upright of each pair. The central rail sections 29 of the upper rails 9L and 9R are secured as by welding to the uprights 69 and 71 at the respective side of the frame extending longitudinally with respect to the trailer somewhat above the lower ends of the uprights. The uprights 69 and 71 are tubular members of rectangular cross section. The forward uprights 69 have extensible legs or jacks 73 slidable up and down therein (see FIG. 8), these jacks having foot plates 75 for bearing on the ground. They are adapted to be maintained in a raised retracted position (FIG. 2) relative to the forward uprights 69 by means of pins 77 received in suitable holes in the forward uprights and in a lower set of holes in the jacks, or in an extended (lowered) position relative to the forward uprights by application of the pins in upper holes in the jacks (FIG. 8).

The rear uprights 71, which are tubular, are slidable up and down on legs 79 received in the uprights and extending down out of the lower ends of the uprights. Wheels 7 are journaled on axles 81 extending laterally outward from the legs 79 adjacent their lower ends. Power means constituted by a pair of hydraulic cylinders 83 is provided for raising and lowering the frame 5 relative to the wheels by sliding the rear uprights 71 up and down on the legs 79. Each cylinder 83 is pin-connected at its upper end as indicated at 85 to the respective upright 71, and has its piston rod 87 extending down from its piston (not shown) to a pin connection at 91 with the respective wheel-carrying extensible leg 79. The arrangement is such that on extending the piston rods 87 of cylinders 83, the rear uprights 71 are pushed up, sliding up on the legs 79, thereby to raise the entire frame 5 (see FIG. 7), and on release of pressure in the cylinders enabling retraction of the piston rods, the frame 5 lowers (the uprights 71 sliding down on the legs 79). Pins 93 held in reserve in holes adjacent the upper ends of the rear uprights 71 are applicable in holes in these uprights when the uprights have been raised to the point where holes 95 are above the upper ends of the legs 79, to take the weight of frame 5 through the pins onto the legs and thence via the wheels 7 to the ground, and thus maintain the frame raised for travel over the road without having the cylinders 83 take the weight of the frame.

Figures 8, 9:
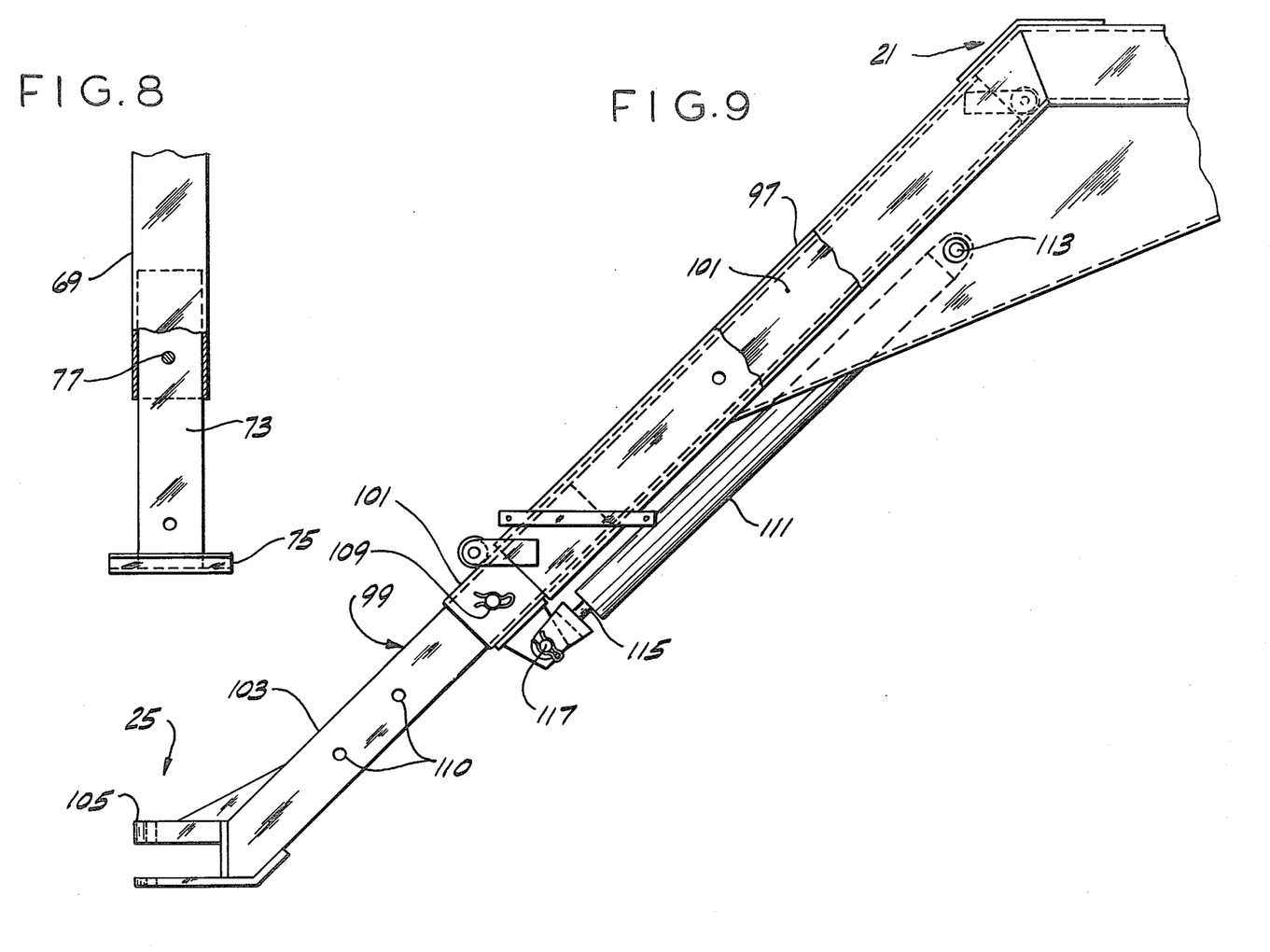
FIG. 8 is a detail of a parking jack of the trailer.
FIG. 9 is a detail of the hitch of the trailer.

The tongue 21 extends generally horizontally over the top 17 of the frame 5 and forward from the frame at a level clear of the bales cradled in the rails 9L, 9R, 11L and 11R, and has a tubular forward end portion 97 angled downward and forward carrying an extensible and retractable hitch 99 (see FIGS. 1 and 9). This hitch 99 comprises a tubular member 101 which is telescopically slidable in the downwardly angled tubular forward end portion 97 of the tongue 21, and a bar 103 pinned in the member 101 and extending downwardly and forward from member 101. The pivot means 25 comprises a clevis 105 at the lower end of bar 103 adapted to receive a hitch pin 107 for hitching the tongue 21 to the drawbar 108 of the towing vehicle 3 with the tongue swingable about the vertical axis of the hitch pin. The pin for pinning bar 103 in member 101 is indicated at 109. It extends through holes in the lower end of member 101 (which extends down out of the tubular end portion 97 of the tongue) and in the bar 103, and the bar 103 has additional holes such as indicated at 110 for adjusting it relative to member 101.

Power means constituted by a hydraulic cylinder 111 is provided for extending and retracting the hitch 99. This cylinder has one end pin-connected at 113 to the forward end portion 97 of the tongue. Its piston rod 115 extends from the piston therein (not shown) through its other end to a pin connection at 117 with the member 101. Rollers such as indicated at 118 are provided for guiding member 101.

The pivot means 23 for pivotally connecting the rear end of the tongue 21 to the top of the frame 5 is located generally at the center of the top of the frame. It comprises a vertical pivot pin 119 (see FIGS. 1, 3 and 6) extending through the tongue adjacent its rearward end having its upper end mounted in an upper crossbar 121 extending between a pair of posts 123 on the longitudinal bars 55 of the top 17 of the frame 5 at the upper ends of these posts, and having its lower end mounted in a lower crossbar 125 extending between the bars 55 in their horizontal plane. The hydraulic cylinder 27 for swinging the tongue relative to the trailer is pin-connected at one end as indicated at 127 on a post 128 extending up from the outer guide member 51 of the rear crossbar 49, and has its piston rod 129 extending from its piston (not shown) to a pin connection at 131 with an arm 133 extending laterally outward from the tongue forward of the pivot means 23. Cylinder 27 is a double-acting cylinder of such stroke and so disposed that with piston rod 129 at generally midstroke the tongue 21 and rear crossbar 49 are at right angles to one another (see the central part of FIG. 1 and also see FIG. 6). On extending the piston rod 129 from midstroke, the tongue 21 is swung right relative to the rear crossbar 49 (see the lower part of FIG. 1), and on retracting the piston rod 129 from midstroke, the tongue 21 is swung left relative to the rear crossbar (see the upper part of FIG. 1).

As noted above, the upper rails 9L and 9R have their central sections permanently secured in suitable manner to the uprights 69 and 71 of the frame 5. They extend longitudinally with respect to the trailer on the inside of the uprights closely adjacent the sides of the frame 5 above the lower ends of the uprights and above the plane of the lower rails 11L and 11R. The latter have outwardly angled forward ends 135 and outwardly angled rearward ends 137. They are carried by brackets 139 extending inward from the uprights 69 and 71 at the sides of the frame so that they are spaced a distance less than the spacing of the upper rails. There are two such brackets at each side, one on the forward upright 69 and one on the rearward upright 71 at the respective side. The spacing of the pair of rails 9L and 11L at the left from the pair of rails 9R and 11R at the right is adapted to be varied by operation of cylinders 57 to vary the spacing of the sides 19L and 19R of the frame, and the position of the lower rails 11L and 11R relative to the upper rails 9L and 9R is adjustable by having the rails 11L and 11R secured to extensible bars 141 of the brackets, these bars being slidable in and out of tubular guides 143 of the brackets and adapted to be secured in various positions of adjustment by pins 145 adapted to be received in one of a series of holes in the extensible bars. The guides 143 extend inward and are inclined downward from the lower ends of the uprights 69 and 71, and this provides for some heighthwise as well as transverse adjustment of the lower rails 11L and 11R. The lower rails are wholly removable, by withdrawing bars 141 from the guides 143, for shipment separately from the frame 5 to conserve shipping space.

The bale stop 15 at the rear end of the rails is constituted by an extensible bar removably mounted on the flaring rear ends 39 of the upper rails 9L and 9R and extending between these rails. More particularly, this stop comprises an outer tubular guide 147 which may be removably pinned at its outer end as indicated at 149 on the rear end of the upper rail 9L, and an inner bar 151 telescopically slidable in and out of the guide 147 removably pinned at its outer end as indicated at 153 on the rear end of the other upper rail 9R. The bale stop 15 may be wholly removed (by pulling the pins 149 and 153) or retracted and stowed as indicated in phantom in FIG. 1.

Pins 155 are provided for locking the tongue 21 in its solid-line position of FIG. 1 at right angles to the crossbars 47 and 49 for towing the trailer straight behind the towing vehicle 3. These pins are removable for permitting swinging of the tongue.

Figure 7:
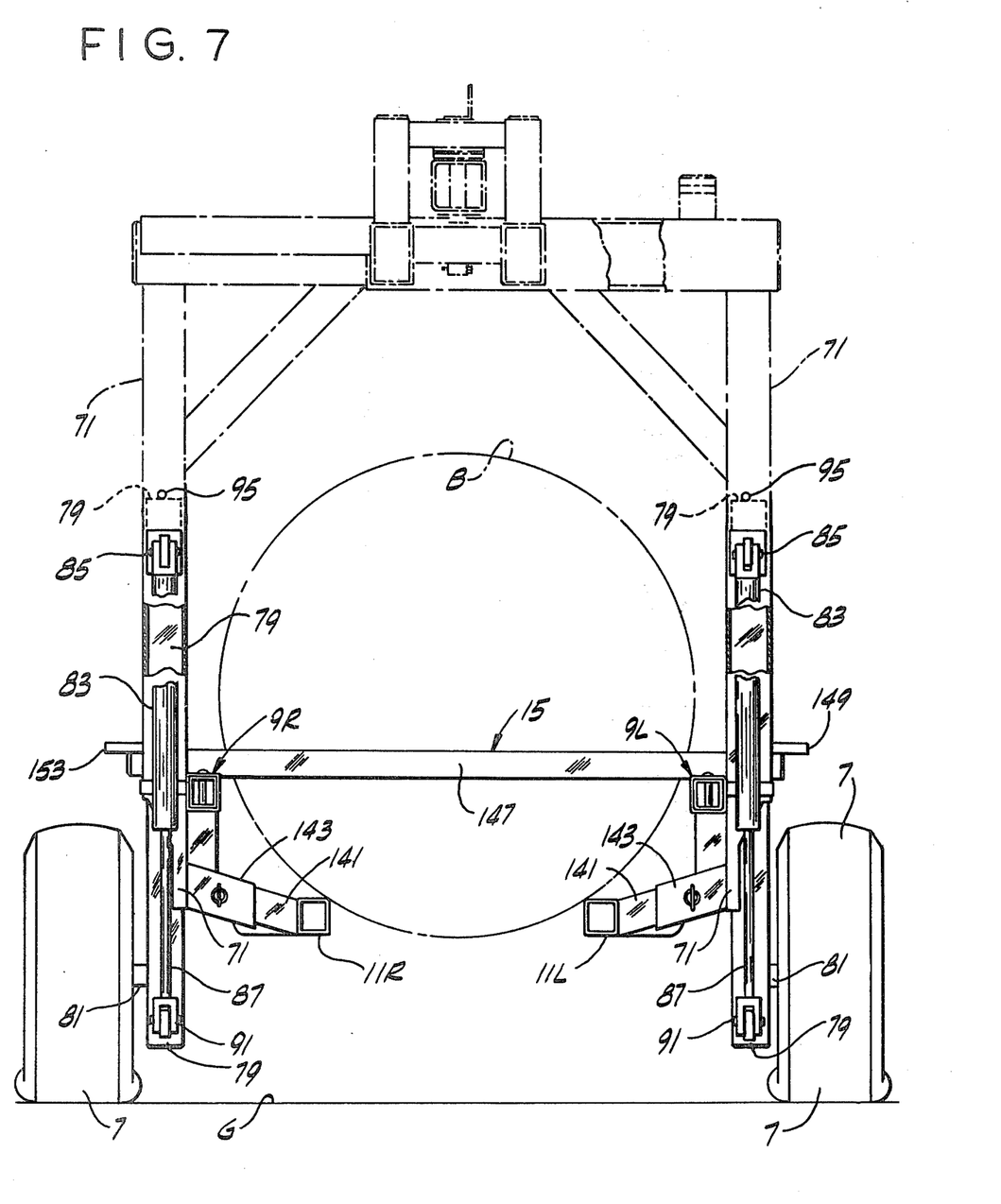
FIG. 7 is a view similar to FIG. 3 showing the frame of the trailer in a raised position.
Figures 10, 13:
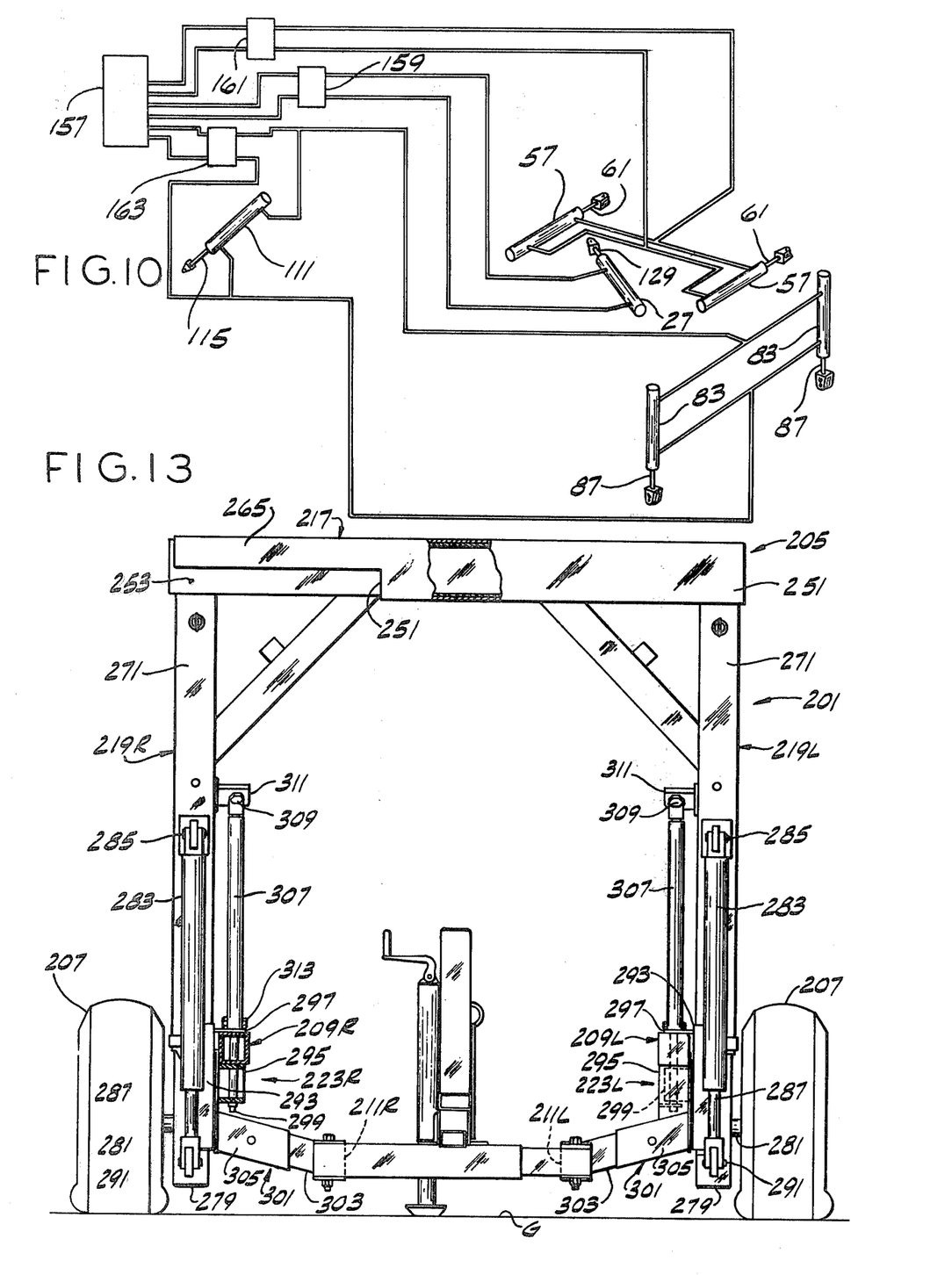
FIG. 10 is a simplified hydraulic circuit diagram.
FIG. 13 is a forward end elevation of the FIG. 11 trailer, as viewed from the left end of FIG. 12.

As diagrammatically illustrated in FIG. 10, the swing cylinder 27, the expansion and contraction cylinders 57, and the lift cylinders 83 and hitch cylinder 111 are adapted to be powered from the usual hydraulic power source 157 on the towing vehicle 3 via hydraulic hose lines including hose couplings for connection and disconnection of portions of the lines extending from the towing vehicle to and from portions of the lines on the trailer. The swing cylinder 27 is under control of a valve 159 operable by the operator of the towing vehicle to extend or retract the piston rod 129 of this cylinder to swing the tongue 21 one way or the other for towing the trailer to the left or right of the towing vehicle (see FIG. 1). The expansion and contraction cylinders 57 are interconnected for conjoint operation and are jointly under control of a valve 161 operable by the operator of the towing vehicle to extend or retract the piston rods 61 of these cylinders laterally to expand or contract the frame 5. The lift cylinders 83 and the hitch cylinder 111 are interconnected for conjoint operation and are jointly under control of a valve 163 operable by the operator of the towing vehicle to raise the frame 5 and also to raise the forward end of the tongue 21, so that the frame and the rails 9L, 9R, 11L and 11R and the tongue remain generally horizontal, and to lower the frame and also the forward end of the tongue so that the frame, rails and tongue remain generally horizontal. FIGS. 2 and 3 show the frame 5 in its lowermost position, in which the lower rails 11L and 11R are close to the ground. FIG. 7 shows the frame in a raised position, in which the lower rails are about two feet, for example, above the ground.

The trailer 1 is hitched to the towing vehicle 3 by means of the pin connection at 107 of the clevis 105 at the lower end of the hitch 99 to the drawbar 108 of the towing vehicle, with the frame 5 and rails 9L, 9R, 11L and 11R and the tongue 21 generally horizontal, and with the hydraulic hose lines extending from the hydraulic power source 157 on the towing vehicle coupled to the hydraulic hose lines on the trailer. The trailer may then be utilized to pick up bales lying on their sides on the ground from the front of the trailer or the rear of the trailer, to transport the bales to the unloading site, and then to unload the bales.

For front loading of the bales, the frame 5 is lowered to its lowermost position in which it appears in FIGS. 2 and 3, which is its bale loading position, by actuating valve 163 to deliver hydraulic fluid to the lower ends of the lift cylinders 83 and the hitch cylinder 111 and to vent fluid from the upper ends of these cylinders. In this lowered bale loading position of the frame, the lower rails 11L and 11R extend generally horizontally closely adjacent the ground G. When the frame is lowered, hitch 99 is correspondingly retracted by cylinder 111 into the tubular forward end portion 97 of the tongue 21 so that the tongue remains generally level. The frame 5 is expanded or contracted laterally by actuating valve 161 to actuate the expansion and contraction cylinders 57 to adjust the spacing of the left-hand pair of rails 9L and 11L from the right-hand pair of rails 9R and 11R generally in accordance with the size of the bales to be loaded so that the lower rails 11L and 11R are spaced a distance less than the diameter of a bale, whereby these rails, being close to the ground and below midheight of a bale, may pass on opposite sides of a bale for lifting it from the ground in a manner resembling a fork lift, and may cradle the bale endwise in the rails. As appears in FIG. 3, the upper rails 9L and 9R are somewhat below midheight of a bale and spaced a distance slightly less than the diameter of a bale. With the pins 155 removed to free the tongue 21 for swinging from side to side, the trailer 1 is pulled forward by the towing vehicle 3 through the field where the bales are lying on their sides on the ground, and maneuvered generally to center the rails relative to the bale so that rails 9L and 11L pass endwise toward the left of the bale and rails 9R and 11R pass endwise toward the right of the bale. The lower rails 11L and 11R, which are spaced apart a distance substantially less than the diameter of the bale and lie close to the ground, pass under the side portions of the bale on opposite sides of the vertical axial plane of the bale in position for cradling and lifting the bale off the ground. By actuating valve 159 to actuate the swing cylinder 27, the trailer may be maneuvered to travel either to the left or to the right of the path of the towing vehicle as illustrated in FIG. 1 and at various positions to the right or the left for utmost facility in loading the bales, as well as being adapted to travel directly in line with the towing vehicle.

When the lower rails 11L and 11R have forked a bale, either at the right or left of the towing vehicle, the frame 5 may be left down if the next bale is nearby, or, if the next bale is some distance off, the frame may be raised by actuating valve 163 to operate cylinders 83 to raise the uprights 71 (and to operate cylinder 111 to raise the forward end of the tongue 21), thereby raising the rails to lift the bale some distance, the bale being cradled on the rails adjacent their forward ends, then re-lowered preparatory to picking up the next bale. Operation of the towing vehicle and trailer may be continued to pick up additional bales without stopping, the bale or bales already on the lower rails being pushed back endwise on the lower rails by engagement of the forward end of the bale or series of bales on the lower rails with the bale being loaded. When the last bale that can be accomodated on the rails is loaded (as illustrated in FIG. 1, four bales are loaded on the rails), the rearward end of the series of bales engages the bale stop or crossbar 15 at the rear end of the rails 9L and 9R. An advantageous effect of this is that the bales are compressed endwise for improved weather resistance in storage.

Once a load of bales has been picked up by and cradled in the lower rails 11L and 11R (the load may comprise four standard bales, for example), with the towing vehicle continuing to travel, cylinder 27 is operated to swing the trailer back to center behind the towing vehicle. Then the vehicle is stopped, pins 155 are inserted to lock the tongue 21 in central position to avoid side drift of the trailer, cylinders 57 are operated to contract the frame to cause the bales to be tightly gripped by the rails, and cylinders 83 and 111 are operated to raise the frame and the tongue to bring the rails (and the bales) to the raised transport position of FIG. 7 where there is maximum ground clearance for transporting the bales. The weight of the frame and the bales is then taken off the hydraulic cylinders 83 by adjusting the uprights 71 to a position wherein pins 93 may be entered in holes 95 so that the load is taken by these pins and transmitted to the ground through the wheels 7.

Alternatively, bales may be loaded on to the trailer 1 from the rear by removing the bale stop 15 from the rear of the rails and applying it to the front of the rails, the upper rails 9L and 9R having holes at their forward ends for receiving pins 149 and 153 to hold the stop in place. Then, bales may be loaded on the rails from the rear by backing up the trailer, which may be swung from side to side as it is being backed up, generally in the same manner as on front loading as above described.

After loading, whether from front or rear, and towing the trailer to the unloading site, the bales may be unloaded either from the front or the rear. For unloading from the front, with the bale stop 15 removed from its front end position at the front end of the rails, the rails are expanded and lowered to lower the bales to the ground, and the trailer backed up to the point where the forward ends of the rails are back of the last bale. Then, by operation of the swing cylinder 27, the trailer is swung out of the way of the bales and then towed forward. For unloading from the rear, with bale stop 15 removed from its rear end position at the rear end of the rails, the rails are expanded and lowered to lower the bales to the ground, and the trailer is towed forward, leaving the bales behind on the ground.

Figure 11:
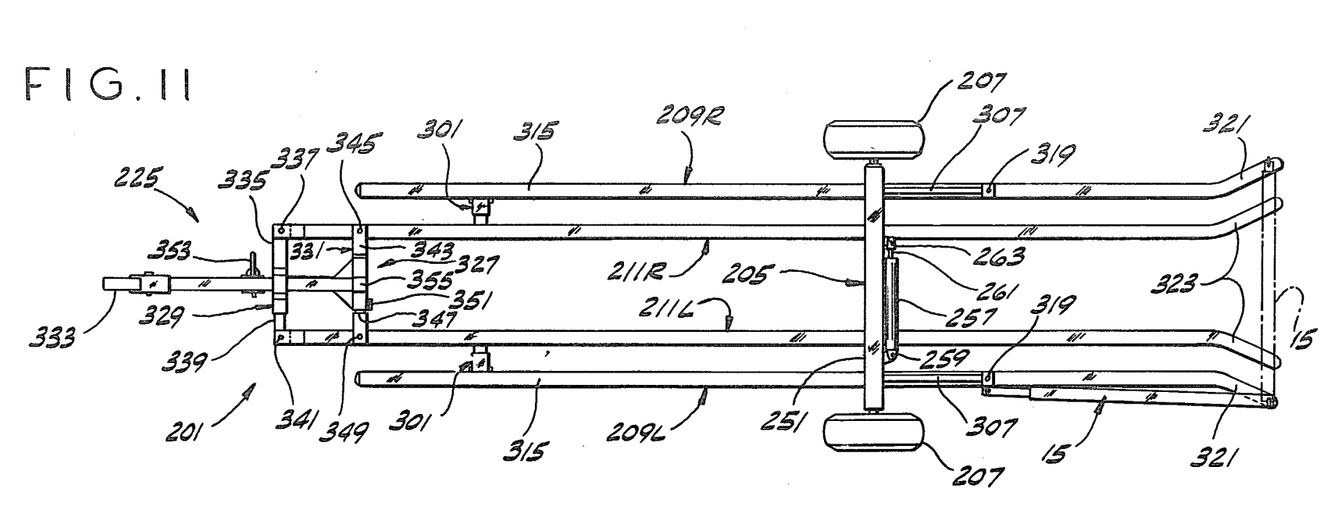
FIG. 11 is a plan of another trailer.
Figure 12:
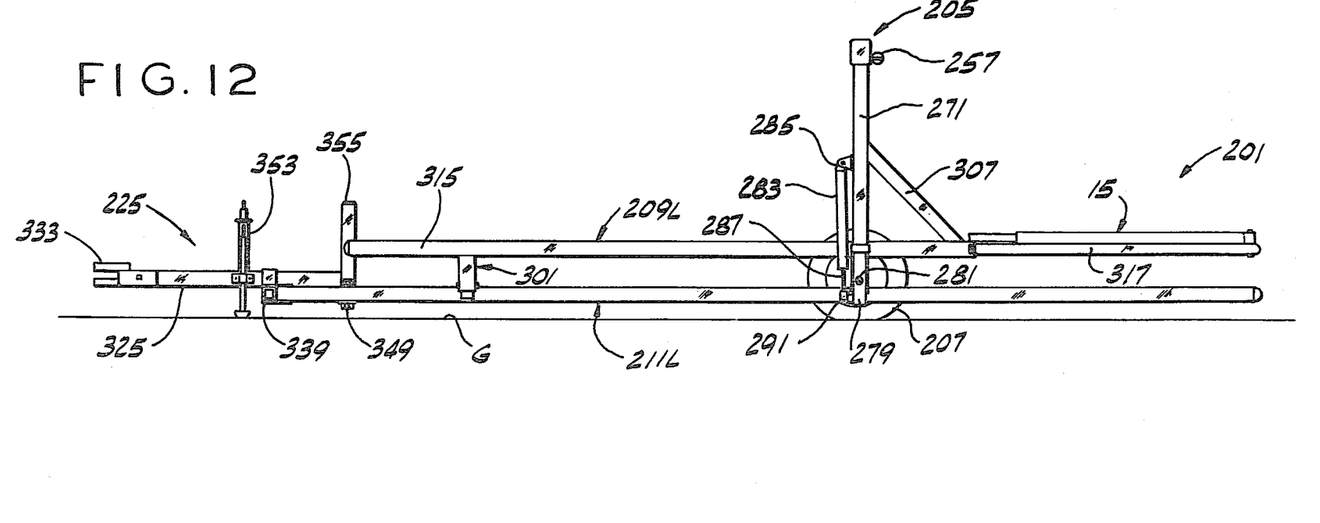
FIG. 12 is a side elevation of FIG. 11.

As will be noted from the above, the trailer 1 shown in FIGS. 1–3 is adapted for nonstop loading and unloading from the front or the rear, involving, among other features, the feature of the swinging tongue 21 extending forward from the top of the frame 5 and the power means 27 for swinging the tongue for towing the trailer on either side as well as in line with the towing vehicle. FIGS. 11–13 illustrate a second trailer designated in its entirety by the reference numeral 201 in which the swing feature is omitted for reasons of economy, the trailer 201, as a result, being operable only for rear loading of bales by backing it up.

Trailer 201 comprises a frame designated in its entirety by the reference numeral 205 on wheels 207, and an upper rail and a lower rail at each side of the frame extending longitudinally of the frame. The upper and lower rails at the left side of the frame (as viewed in forward direction) are designated 209L and 211L, and the upper and lower rails at the right side are designated 209R and 211R. These rails, like the rails of the trailer 1, are adapted to support a series of bales B cradled in the rails in end-to-end relation.

The frame 205 is generally of inverted U-shape, having an upper portion or top generally designated 217 above the level of bales cradled in the rails, and left-hand and right-hand sides generally designated 219L and 219R extending down from the top. The rails 209L and 211L and the rails 209R and 211R extend longitudinally of the frame at the left and right sides of the frame on the inside of the sides of the frame. They extend forward and rearward from the frame and are spaced transversely of the frame for supporting the series of bales B with the series extending through the frame between the sides of the frame and under the top of the frame. Means indicated generally at 223L is provided for pivoting the left-hand rails 209L and 211L for swinging movement of the left-hand rails about a generally vertical axis on the inside of the left side of the frame, and means indicated generally at 223R is provided for pivoting the right-hand rails 209R and 211R for swinging movement of the right-hand rails about a generally vertical axis on the inside of the right side of the frame. Means indicated generally at 225 is provided at the forward end of the rails for hitching the trailer 201 to the towing vehicle.

The top 217 of the frame 205 comprises means which is extensible and retractable laterally in respect to the trailer similarly to the top 17 of frame 5 for varying the spacing of the sides 219L and 219R of the frame and hence varying the spacing and angularity of the pair of rails 209L, 211L and the pair of rails 209R, 211R. Thus, the top 217 of the frame comprises a tubular outer guide member 251 of rectangular cross section (like the guide member 51 of the rear crossbar 49 of the frame 5) and an inner extensible and retractable member 253 also of rectangular cross section having a telescoping sliding fit in the outer guide member. A double-acting hydraulic cylinder 257 is pinned as indicated at 259 to the outer guide member 251 and has its piston rod 261 extending from the piston therein (not shown) to a pin connection at 263 with the inner member 253 for telescopically extending and retracting the inner member relative to the outer guide member. The outer guide member has an extension 265 of half cross section covering the inner member 253.

The left-hand side 219L and the right-hand side 219R of the frame 205 each comprises an upright 271 (like upright 71 of the frame 5). Member 251 extends toward the left from the upper end of the left upright 271 and member 253 extends out of the right end of member 251 to the upper end of the right upright 271. The uprights 271 are tubular members of rectangular cross section (like uprights 71), and are slidable up and down on legs 279 (like legs 79) received in the uprights and extending down out of the lower ends of the uprights. Wheels 207 are journaled on axles 281 extending laterally outward from the legs 279 adjacent their lower ends. Power means constituted by a pair of hydraulic cylinders 283 (like cylinders 83) is provided for raising and lowering the frame 205 relative to wheels 207 by sliding the uprights 271 up and down on the legs 279. Each cylinder 283 is pin-connected at its upper end as indicated at 285 to the respective upright 271, and has its piston rod 287 extending down from its piston (not shown) to a pin connection at 291 with the respective wheel-carrying extensible leg 279.

The means 223L for pivoting the left-hand rails on the left-hand upright 271 and the means 223R for pivoting the right-hand rails on the right-hand upright 271 each comprises a bracket 293 secured to the upright 271 on the inside of the upright adjacent its lower end having an inwardly extending rail support 295 and a lug 297 above the rail support. The upper rail (209L, 209R) is supported on the rail support 295, extending between the rail support and the lug, and is pinned between the lug and the support by a pin 299 extending through the lug, the rail and the support, the arrangement being such as to permit the upper rail to pivot on the support about the axis of the pin. The lower rail at each side is carried by brackets 301 extending down from the upper rail at that side, whereby the lower rail is movable up and down with the upper rail as the frame 205 is raised and lowered, and also is swingable about the axis of the pin 299 conjointly with the upper rail. The lower rails are secured to extensible bars 303 of the brackets 301, these bars being slidable in and out of tubular guides 305 of the brackets (like bars 141 and guides 143 of the trailer 1). Braces 307 are provided between the uprights 271 and the upper rails, these braces being pinned at their upper ends as indicated at 309 to angled brackets 311 on the inside of the uprights, and pinned as indicated at 313 at their lower ends to the upper rails, with the arrangement such as to permit the pivoting of the rails on the pins 299. The braces hold the frame 205 upright.

The upper left-hand rail 209L and the upper right-hand rail 209R each comprises a forward section 315 constituted by a tubular member of rectangular cross-section and a rearward end section 317 removably secured by a pin 319 to the forward section. The forward section of each upper rail is pinned by the respective pin 299 to the respective upright 271 somewhat forward of its rearward end, and the braces 307 extend downwardly and rearwardly from the brackets 311 on the uprights to adjacent the rearward ends of the forward section. The rearward end sections have flaring rear ends 321. The lower rails 211L and 211R are made in one section and have flaring rear ends 323.

The hitching means 225 comprises a tongue 325 extending forward from a yoke 327 at the forward end of the lower rails 211L and 211R. The yoke comprises a first extensible and retractable crossbar 329 extending between the forward ends of the lower rails and a second extensible and retractable crossbar 331 extending between the lower rails rearward of and adjacent the first crossbar, with the tongue 325 secured on top of these crossbars and extending forward therefrom beyond the forward ends of the rails and having a clevis 333 at its forward end for receiving the hitch pin 107 for hitching the tongue to the towing vehicle 3. The first crossbar comprises a tubular outer guide member 335 of rectangular cross section pinned at one end to the forward end of the right-hand lower rail 211R as indicated at 337, and an inner member 339 having a telescoping sliding fit in the outer member, extending to the left out of the outer member, and pinned at its outer (left) end as indicated at 341 to the forward end of the lower left-hand rail. The inner member 339 is freely slidable in the outer guide member 335. The second crossbar similarly comprises a tubular outer guide member 343 of rectangular cross section pinned at one end to the right-hand lower bar 211R as indicated at 345, and an inner member 347 having a telescoping sliding fit in the outer member and extending to the left out of the outer member and pinned at its outer (left) end as indicated at 349 to the left-hand lower bar 211L. A pin 351 receivable in a series of holes (not shown) in the members 343 and 347 holds these members in various positions of adjustment. Thus, yoke 327 is adjustable via lengthwise adjustment of the crossbar 331 to vary the spacing of the pivot connections at pins 345 and 349 of the rails and the yoke; the rails pivot about the pins 345 and 349 in any of the various adjustments of the length of the crossbar 331, with crossbar 329 lengthening or shortening as they pivot. At 353 is indicated a parking jack on the tongue 325, the latter being secured on top of the outer guide members 335 and 343. A bale stop in the form of a post 355 extends up from the outer guide member 343 of crossbar 331 at the rear of the tongue 325. A bale stop like bar 15 may be applied to the rear ends of the upper rails.

The expansion and contraction cylinder 257 and the lift cylinders 283 are adapted to be powered from the hydraulic power source 157 on the towing vehicle 3 via hydraulic base lines similarly to the hydraulic powering of cylinders 57 and 83 of the trailer 1, under control of valves similar to valves 161 and 163. Cylinder 257 is operable by the operator of the towing vehicle to expand or contract the frame 205. FIGS. 11–13 show the frame in its fully contracted condition, in which the uprights 271 at the sides of the frame are spaced about 62½ inches (inside to inside), for example. In this fully contracted condition of the frame (its narrowest state), the rails 209L and 211L at the left extend generally parallel to the rails 209R and 211R at the right (see FIG. 11). Upon expansion of the frame, with resultant spreading apart of the pivot pins 299, the rails are caused to swing outwardly about the axes of the pivot pins at 345 and 349, thus making the spacing of the rails wider at the rear than at the front.

With the trailer 201 hitched to the towing vehicle 3, the trailer may be utilized to pick up bales from the rear by removing or stowing the bar 15, expanding the frame 205 to some extent so that the left-hand and right-hand rails diverge relative to one another from front to rear, lowering the frame so that the lower rails 211L and 211R, at their rear ends, are close to the ground, and backing up the trailer and maneuvering it generally to center the rails relative to a bale to be picked up so that the rails 209L and 211L pass endwise toward the right of the bale (as viewed toward the rear) and rails 209R and 211R pass endwise toward the left of the bale. The lower rails 211L and 211R, which are spaced apart a distance substantially less than the diameter of the bale and lie close to the ground, pass rearward under the side portions of the bale on opposite sides of the vertical axial plane of the bale in position for cradling and lifting the bale off the ground. Additional bales are picked up in the same manner, the bale or bales already on the lower rails being pushed forward endwise on the rails by engagement of the rearward end of the bale or series of bales on the rails with the forward end of the bale being loaded. When the last bale has been loaded, the frame is contracted so that the bales are tightly gripped by the rails, bar 15 is placed at the rear of the rails, and the frame and rails are then raised to the maximum elevation for transporting the bales to the unloading site. The weight is taken off the hydraulic cylinder 283 in a manner similar to that described above for taking the weight off cylinders 83. For unloading, bar 15 is removed or stowed, the frame and rails are expanded and lowered to lower the bales to the ground, and the trailer is towed forward, leaving the bales behind on the ground.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrive and not in a limiting sense.

What is claimed is:

1. A trailer adapted to be towed by a towing vehicle for picking up round bales of hay or the like lying on their sides on the ground and transporting the bales, said trailer comprising:

a frame generally of inverted U-shape thereby having a top and sides extending down from the top, the top comprising means which is extensible and retractable for varying the spacing of the sides;

a wheel at each side of the frame at the bottom of the frame, said wheels being on an axis extending transversely of the frame;

rails carried by the sides of the frame extending longitudinally at opposite sides of the frame on the inside of the sides of the frame, the rails extending forward and rearward from the frame and spaced apart transversely of the frame for supporting a series of round bales cradled in the rails in end-to-end relation with the series extending through the frame between the sides of the frame and under the top of the frame, said rails comprising an upper rail and a lower rail carried by each side of the frame on the inside thereof, the upper rails being closely adjacent the sides of the frame and the lower rails being carried by means extending inward from the sides of the frame so that the lower rails are spaced a distance less than the spacing of the upper rails;

means for hitching the frame to a towing vehicle;

power means for raising and lowering the frame relative to the wheels thereby to raise and lower the rails; and power means for extending and retracting the extensible and retractable top means for varying the spacing of the sides of the frame and the rails carried thereby.

2. A trailer adapted to be towed by a towing vehicle for picking up round bales of hay or the like lying on their sides on the ground and transporting the bales, said trailer comprising:

a frame generally of inverted U-shape thereby having a top and sides extending down from the top, the top comprising means which is extensible and retractable for varying the spacing of the sides;

a wheel at each side of the frame at the bottom of the frame, said wheels being on an axis extending transversely of the frame;

rails carried by the sides of the frame extending longitudinally at opposite sides of the frame on the inside of the sides of the frame, the rails extending forward and rearward from the frame and spaced apart transversely of the frame for supporting a series of round bales cradled in the rails in end-to-end relation with the series extending through the frame between the sides of the frame and under the top of the frame;

means for hitching the frame to a towing vehicle comprising a tongue extending forward from the top of the frame beyond the forward end of the rails for connection to the towing vehicle;

means pivotally connecting the tongue to the top of the frame for swinging of the tongue relative to the frame about a generally vertical axis;

power means for swinging the tongue relative to the frame for pulling the trailer to the right or left of the towing vehicle or in line with the towing vehicle;

power means for raising and lowering the frame relative to the wheels thereby to raise and lower the rails; and power means for extending and retracting the extensible and retractable top means for varying the spacing of the sides of the frame and the rails carried thereby.

3. A trailer as set forth in claim 2 having a downwardly extending extensible and retractable hitch at the forward end of the tongue, said hitch having means at its lower end for pivotal connection to the towing vehicle with the pivotal connection permitting swinging of the hitch relative to the towing vehicle about a vertical axis.

4. A trailer as set forth in claim 3 having power means for extending and retracting the hitch.

5. A trailer as set forth in claim 4 wherein the power means for raising and lowering the frame and the power means for extending and retracting the hitch are operable in unison under a single control for extending the hitch on raising the frame and retracting the hitch on lowering the frame.

6. A trailer as set forth in claim 5 wherein the power means for raising and lowering the frame, the power means for extending and retracting the extensible and retractable top means of the frame, the power means for swinging the tongue, and the power means for extending and retracting the hitch comprise hydraulic cylinder means adapted to be powered from a hydraulic power source on the towing vehicle.

7. A trailer as set forth in claim 4 having a stop at the rear end of the rails engageable by a series of bales on the rails.

8. A trailer as set forth in claim 7 wherein the stop is constituted by a crossbar removably mounted on the rails at their rear end, said crossbar being extensible and retractable endwise for accommodation to variation in spacing of the rails.

9. A trailer adapted to be towed by a towing vehicle for picking up round bales of hay or the like lying on their sides on the ground and transporting the bales, said trailer comprising: a frame on wheels adapted to roll over the ground, rails extending longitudinally at opposite sides of the frame spaced apart transversely of the frame for supporting a series of round bales cradled in the rails in end-to-end relation, said frame having an upper portion above the level of bales cradled in the rails, a tongue extending forward from said upper portion of the frame beyond the forward end of the rails, and having a downwardly extending forward end portion provided with a hitch for connection of the tongue to the towing vehicle with the tongue extending generally parallel to the rails and above said series of bales, means pivotally connecting the tongue to said upper portion of the frame, for swinging of the tongue relative to the frame about a generally vertical axis, and power means for swinging the tongue relative to the trailer for pulling the trailer to the right or left of the towing vehicle or in line with the towing vehicle.

10. A trailer as set forth in claim 9 having a downwardly extending extensible and retractable hitch at the forward end of the tongue, power means for raising and lowering the rails, and power means for extending and retracting the hitch.

11. A trailer as set forth in claim 10 wherein the power means for raising and lowering the rails and the power means for extending and retracting the hitch are operable in unison under a single control for extending the hitch on raising the rails and retracting the hitch on lowering the rails.

12. A trailer as set forth in claim 10 having power means for varying the spacing of the rails.

13. A trailer as set forth in claim 12 wherein the frame comprises a forward and a rearward upright at each side of the frame, forward and rearward extensible and retractable top members between the upper ends of the forward and rearward uprights, and a pair of legs each vertically movable relative to a respective rearward upright, the wheels being mounted on the legs at their lower ends.

14. A trailer as set forth in claim 13 wherein the rearward uprights are tubular members and the legs are slidably received in the tubular members.

* * * * *